United States Patent [19]

Thorsen et al.

[11] 4,282,189

[45] Aug. 4, 1981

[54] PRECIPITATION OF METAL VALUES FROM ORGANIC MEDIA

[76] Inventors: Gunnar Thorsen, Steinhaugen 41,, 7000 Trondheim, Norway; Andrew J. Monhemius, 64 S. Western Rd., St. Margarets, Twickenham, Middlesex, England

[21] Appl. No.: 119,112

[22] Filed: Feb. 6, 1980

[30] Foreign Application Priority Data

Feb. 7, 1979 [GB] United Kingdom ............... 04232/79

[51] Int. Cl.³ ...................... C01B 13/18; C01B 13/36
[52] U.S. Cl. ..................................... 423/24; 423/100; 423/112; 423/139; 423/70; 423/1; 423/658.5; 423/DIG. 14
[58] Field of Search ..................... 423/1, 24, 100, 139, 423/592, 604, 594, 633; 75/101 BE; 210/32, 21; 562/609, 611

[56] References Cited

U.S. PATENT DOCUMENTS

| 3,193,347 | 7/1965 | Forward | 423/54 |
|---|---|---|---|
| 3,193,381 | 6/1965 | George | 423/139 |
| 3,673,154 | 6/1972 | Trevillyan | 423/140 |
| 4,042,501 | 8/1977 | King | 423/633 |
| 4,145,301 | 3/1979 | Bruylants | 423/633 |

FOREIGN PATENT DOCUMENTS 2636  2/1979  Japan ........................................ 423/604

OTHER PUBLICATIONS

Wadsworth "Review of Developments in Hydrometallurgy 1979", *Journal of Metals,* Apr. 1980, pp. 27-31.

*Primary Examiner*—Brian E. Hearn
*Attorney, Agent, or Firm*—Murray & Whisenhunt

[57] ABSTRACT

Metal values, such as iron, may be stripped from an organic liquid medium loaded with metal ions by a process which comprises contacting the organic medium with an aqueous phase at a contact temperature which is sufficiently high to cause the metal values to precipitate as metal oxide, hydroxide or hydrate (or a mixture thereof) in the presence of the organic medium.

13 Claims, No Drawings

PRECIPITATION OF METAL VALUES FROM ORGANIC MEDIA

This invention concerns the stripping and precipitation of metal values from organic media by a hydrolysis reaction.

If a metal-containing organic medium is contacted with an aqueous phase, the metal will under appropriate conditions preferentially be stripped from the organic phase and migrate to the aqueous phase but will remain there as dissolved ions. This method is simple and widely employed but further processing (such as electrowinning) is required in order to recover the metal values from the aqueous stripping solution.

Furthermore it is known from British Pat. Specification No. 1,215,574 to recover copper metal directly from a copper-containing organic medium (such as a copper salt of a tertiary carboxylic acid dissolved in a hydrocarbon) by bubbling hydrogen through the organic medium. Where the acid is RH, the reaction involved is $$R_2Cu + H_2 \rightarrow 2RH + Cu$$

Although this method yields metal as an elemental solid, its applicability is limited to some metals. It is often in any case not necessary to obtain the metal itself but sufficient to obtain a simple compound of the metal, as long as the compound is a solid.

It is also widely known that metal oxides and basic salts can be precipitated from acidic aqueous solutions by reactions known under the general name of high temperature hydrolysis.

This type of hydrolysis is brought about by heating the aqueous solutions to temperatures near or above their boiling points. An example is the following reaction performed with water near its boiling point (under pressure if need be, to raise the boiling point), there being present only an aqueous (and no organic) phase:

$$FeCl_3 + 2H_2O \rightarrow 3HCl + FeOOH$$

The hot chloride solution is highly corrosive.

Another example of aqueous precipitation is the precipitation of iron as jarosite, widely used in the zinc industry. However, in practice the hydrolysis product is often contaminated with other metal salts. The contamination arises from co-precipitation of the anions present, and sometimes even of cations due to the presence of impurities. The contamination and corrosion that occur constitute a technical problem.

According to the present invention, an organic liquid medium loaded with metal ions is stripped of metal values by contacting the medium with an aqueous phase at a temperature of contact which is high enough to cause the metal values to be precipitated as metal oxide in the presence of the organic medium. A preferred temperature is from 95° C. to 250° C., more preferably at least 150° C., with a preferred range being from 150° C. to 200° C.

The organic liquid medium suitably comprises a liquid cation exchanger and preferably comprises an organic acid. Where the organic medium contains the metal salt of an organic acid, the reaction may in general terms be written as $$R_nM + n/2 H_2O \rightarrow nRH + MO_{n/2}$$

where RH is the organic acid or a component thereof, and the metal M has a valency of n. The metal oxide can of course take alternative forms and by the term "metal oxide" as used herein we include the various solid metal and oxygen containing precipitates which can form, i.e. oxides, hydroxides, hydrates and mixtures thereof. Thus, for example, where n=3, a hydrate MOOH may be formed for example by iron in particular.

The preferred organic medium comprises at least one aliphatic carboxylic acid, optionally with a suitable carrier which may conveniently be a paraffin, or other organic solvent. Long chain carboxylic acids are preferred, especially highly branched predominantly tertiary carboxylic acids. Highly suitable acids are those known as Versatic 10 and Versatic 911. Suitable carriers are Escaid 110 and Shellsol T. An approximately 1:2 ratio of carboxylic acid to carrier has been found suitable for general use but of course, other ratios can be used. Versatic, Escaid and Shellsol are trade marks. Versatic 10 is a mixture of branched saturated aliphatic carboxylic acids over 97% of which contain 10 carbon atoms, and including about 1% of $C_9$ acids. Versatic 911 is a mixture of carboxylic acids having 9, 10 and 11 carbon atoms and containing secondary and tertiary acids in the approximate proportions 1:9, with no primary acids. Shellsol T is a mixture of open-chain aliphatic hydrocarbons of boiling range 187.5° to 210° C. Escaid 110 is a mixture of aliphatic hydrocarbons having a boiling range of 198°–244° C.

In general the organic medium is contacted with sufficient of a separate aqueous phase for the reaction to proceed to completion.

We have found that, when using elevated pressures, an aqueous phase to organic phase ratio of as low as 1:20 or even lower can be used. However, when using normal pressure, a 1:1 phase ratio appears to be more suitable.

The metal values are recovered as a solid oxide product and the organic component is regenerated and can, after a solid-liquid separation, be recycled to be reloaded with further metal ions. Thus, for example, for an organic acid as the organic medium the following loading reaction may occur:

$$M^{n+} + nRH \rightarrow R_nM + nH^+$$

Of course, other methods of loading are possible

The preferred metals which we have found suitable for precipitation are iron, copper or nickel (which typically are precipitated as $Fe_2O_3$, $Cu_2O$ and $Ni(OH)_2$ respectively), while slight yields may be possible from aluminium, titanium and zinc. Cadmium, cobalt, chromium, manganese and lead appear to be more difficult metals for stripping in accordance with the invention. However co-precipitation effects have been found to occur. For example where nickel and cobalt occur together in the organic phase, some cobalt usually co-precipitates (as a substituent in the $Ni(OH)_2$ lattice), but in a smaller proportion than the nickel. Thus the invention may be used to concentrate metal A in a mixture of metals A and B, where A is more suitable for stripping according to the invention than is B, by causing the organic liquid medium to contain the mixture of metals A and B, and contacting the medium with an aqueous phase as set forth above, whereby the oxide which is precipitated is relatively enriched in A.

However, in some circumstances it may be desirable to obtain a mixed oxide precipitate. Thus, for example, it is possible to co-precipitate cobalt and iron values to obtain a ferrite such as $CoFe_2O_4$. Other ferrites which may be obtained include those containing ferric iron and magnesium, manganese, zinc, ferrous iron and possibly nickel and copper ions. Ferrites themselves have commercial value, for example in magnetic recording tapes.

We have found that the rate of the precipitation can be increased by seeding the reaction by incorporation of some metal oxide precipitate obtained in a previous run. Alternatively other materials capable of acting as catalysts may be used for seeding. We have found that the recycling of precipitate from one run to the next increases the precipitation rate and the particle size range of the precipitate, thus improving the filtration characteristics of the reaction mixture.

While it is in many cases preferred to use water in the process of the invention, it is also possible to use a dilute acid as the aqueous phase. Suitable acids are sulphuric acid and hydrochloric acid, suitably in concentrations of up to about 40 g/l. The use of dilute acid allows the reaction to be carried out at a comparatively low temperature, for example at the boiling point of the reaction mixture at normal pressures, thus avoiding the use of pressurising equipment which may be necessary when operating at neutral pH.

It will be seen from the foregoing that the present invention may offer the following advantages:

(i) There need not be any inorganic anions in the system, except $OH^-$ and $O^{2-}$. Thus, in principle, the only metal-containing solid phases that will be formed are oxides (including hydrated oxides). Contamination of the metal oxide with other metal salts, which often occurs during precipitation from aqueous solutions, may therefore be substantially eliminated. A reduction in inorganic effluent disposal problems is therefore obtained.

(ii) The absence of inorganic anions from the system considerably reduces corrosion problems compared with those associated with a purely aqueous-phase hydrolysis.

(iii) The organic medium containing the metal values in the form of the metal salt of the organic acid can be easily produced, by known solvent extraction techniques, from impure or multicomponent aqueous solutions, for example, as described in U.K. Pat. No. 1,474,944. By use of these techniques, the metal extracted into the organic phase can be purified to any desired degree and therefore the production of very pure metal oxides should be possible in the hydrolytic stripping step, practically nothing being present which could co-precipitate alongside the desired metal oxide.

(iv) Specifically in the case of iron, the present method can extract iron from process liquors and effluents in a directly useful form, since the iron oxides formed should be suitable as feed material for a blast furnace or for other specific uses, such as magnetic uses.

The invention is capable of industrial exploitation in many ways. Thus, for example, the invention may be used in the isolation of iron values from the zinc or copper process liquors which occur in the hydrometallurgical processes used for the production of these metals. Thus, for example, iron may be preferentially extracted into an organic medium, such as one containing Versatic 10 or 911 from a zinc process liquor (for example as described in U.K. Pat. Specification No. 1,474,944). The iron values can then be precipitated in oxide form in accordance with the invention.

Other industrial uses are of course possible. Thus the invention may be applied to the treatment of effluents bearing iron, or other metals, such as spent pickle liquors, effluents from titanium dioxide plants and mine waters. The use of the invention is also contemplated for such further purposes as the precipitation of special oxides, including mixed oxides, for example for magnetic uses, the precipitation of oxides for use in pigments and the recovery of nickel as a hydroxide from process liquors.

The following examples illustrate the invention.

The metal-loaded organic acid-containing media used as starting materials in the examples were each obtained in one of the following three ways:

(A) The organic acid-containing medium was loaded with metal by stirring with a suitable aqueous metal salt solution and slowly adding concentrated sodium hydroxide solution.

(B) The metal oxide or hydroxide was directly dissolved in the organic acid-containing medium.

(C) Solid calcium hydroxide was dissolved in the organic acid-containing medium with heating and stirring and then a concentrated solution of a salt of the desired metal added slowly.

In each case (A), (B) and (C), after loading the organic solutions were washed with water and filtered through phase-separation paper to remove entrained water.

EXAMPLES 1 TO 3

The starting material in Examples 1-3 was an organic liquid containing 11 g/l of Fe loaded by method A above using ferrous sulphate solution. The organic liquid itself consisted of 1 volume of Versatic 911 dissolved in 2 volumes of Shellsol T.

In Examples 1 to 3, 4 volumes of the starting material were heated with 1 volume of water in a pressurised autoclave with stirring under a nitrogen atmosphere for 3 hours (about $10^4$ second).

EXAMPLE 1

Heating at 130° C. gave lepidochrocite, FeOOH, plus hematite, $Fe_2O_3$, as a very fine powder in 10% yield.

EXAMPLE 2

Heating at 180° C. gave magnetite, $Fe_3O_4$, plus hematite, $Fe_2O_3$, as a fine powder in 95% yield.

EXAMPLE 3

Heating at 250° C. gave magnetite, $Fe_3O_4$, as a dense, highly crystalline, coarse powder in 97% yield.

EXAMPLE 4

An organic liquid, 1 volume of Versatic 10 dissolved in 2 volumes of Escaid 110, totalling 120 ml and containing 10.5 g/l $Fe^{3+}$ loaded by method C above, was heated to 150° C. in a pressurised vessel under nitrogen with stirring. A 10 ml shot of water was injected, and the temperature held steady. Precipitation proceeded steadily, until, after 2 hours, 15% of the iron had precipitated (as hematite). Precipitation was continuing at the same rate after 3½ hours.

EXAMPLE 5

Example 4 was repeated but at a temperature of 170° C. After 50 minutes, 90% of the iron had precipitated (as hematite with some magnetite). After 1½ hours, substantially all the iron had precipitated.

EXAMPLE 6

Example 4 was repeated but at a temperature of 185° C. After 15 minutes, substantially all the iron had precipitated (as hematite with some magnetite).

We have found that using fresh Versatic 10 containing ferric salt, precipitation is typically of hematite with some magnetite, but when the Versatic 10 has previously been in contact with water, the precipitate tends to be of hematite only. Where it is desired to obtain a precipitate containing magnetite from already-recycled Versatic 10, it may be advisable to use a ferrous salt as the starting material. Similar behaviour may be expected from other Versatic acids.

EXAMPLE 7

This example illustrates the effect of seeding a precipitation of iron values using ferric oxide precipitated in a previous run.

The organic medium used was 1 volume of Versatic 10 dissolved in 2 volumes of Escaid 110 loaded with ferric ions by method C above using ferric chloride solution to a loading of 21.5 g/l. 200 ml of ferric loaded organic media were heated to 170° C. in a pressurised vessel under nitrogen with stirring. A 10 ml shot of water was injected and the temperature held steady. In the initial run with no seeding, precipitation of ferric oxide reached a maximum of 95 to 100% only after 90 minutes. In a second run, to which was added 1.5 g. of ferric oxide obtained in the first run, the precipitation reached the same maximum after only about 45 minutes. Not only was the precipitation rate increased but the particle size range was also increased.

EXAMPLES 8 TO 10.

The starting material in Examples 8–10 was 5 volumes of organic liquid containing 10 g/l of a specified metal as metal carboxylate. The organic liquid consisted of 1 volume of Versatic 911 dissolved in 2 volumes of Shellsol T. The starting material was loaded into a glass tube with 1 volume of water. Leaving a small air space, the tube was sealed and heated to 200° C. for 4 hours. Precipitation occurred in each case.

EXAMPLE 8

The metal was nickel and the organic liquid was loaded with nickel by method A above. The precipitate was nickel hydroxide, $Ni(OH)_2$.

EXAMPLE 9

The metal was copper and the organic liquid was loaded with copper by method A above. The precipitate was cuprous oxide, $Cu_2O$.

EXAMPLE 10, 10A, 10B

The metal was in turn titanium, aluminium and zinc. The organic liquids were loaded with titanium and aluminium by method A above and with zinc by method B above. The precipitate was not identified in any of these cases.

EXAMPLE 11

An organic liquid, 1 volume of Versatic 10 dissolved in 2 volumes of Escaid 110, totalling 200 ml and containing 20 g/l $Ni^{2+}$ loaded by method A above, was heated to 155° C. in a pressurised vessel under nitrogen with stirring. A 18 ml shot of water was injected and the temperature held steady. After 1 hour, an equilibrium was reached, with 70% of the nickel having precipitated. We tentatively believe that the reaching of an equilibrium may be related to the fact that $Ni(OH)_2$ is soluble in Versatic, whereas, for example, $Fe_2O_3$ is not.

EXAMPLE 12

Example 11 was repeated but at a temperature of 178° C. An equilibrium was reached after about ½–¾ hour, with 90% of the nickel having precipitated.

EXAMPLE 13

An organic liquid, 1 volume of Versatic 10 dissolved in 2 volumes of Escaid 110, totalling 200 ml and containing 23 g/l $Cu^{2+}$ loaded by method A above, was heated to 170° C. in a pressurised vessel under nitrogen. A 10 ml shot of water was added, and the temperature held steady. After 2 hours, 40% of the copper had precipitated (all as cuprous oxide $Cu_2O$).

EXAMPLE 14

Example 13 was repeated but at a temperature of 200° C. All the copper was precipitated in a short time, again as $Cu_2O$.

The following Examples 15 and 16 illustrate the production of mixed precipitates using the method of the invention.

EXAMPLE 15

An organic liquid (1 volume of Versatic 10 dissolved in 2 volumes of Escaid 110, totalling 200 ml) was prepared containing both cobalt and nickel in the ratio 1:8½ (that is, 2 g/l $Co^{2+}$ plus 17 g/l $Ni^{2+}$) by mixing cobalt and nickel loaded solutions loaded by method A above. The loaded liquid was heated to 178° C. in a pressurised vessel under nitrogen with stirring. A 10 ml shot of water was added, and the temperature held steady. After 15 minutes, an equilibrium was reached; 85% of the nickel but only 36% of the cobalt had precipitated. Thus, the cobalt:nickel ratio had moved further in favour of nickel (i.e. there was enrichment of nickel in the precipitate) to the extent of 1:17.3 (by analysis), tallying reasonably with the ratio 1:20.3 calculated from the above.

EXAMPLE 16

Iron loaded and cobalt loaded organic liquids were prepared using method A for cobalt and method C for iron. The organic liquids consisted of 1 volume of Versatic 10 dissolved in 2 volumes of Escaid 110. 160 ml of iron loaded liquid and 40 ml of cobalt loaded liquid were mixed to give an organic phase concentration of 17.4 g/l iron and 4.5 g/l cobalt. The organic phase was heated to 176° C. in a pressurised vessel under nitrogen with stirring. A 10 ml shot of water was injected and the temperature held steady. The precipitation of the iron and cobalt was observed. The precipitation of both metal values reached 95 to 100% after some 90 minutes and the mixed precipitate was found to be a ferrite $CoFe_2O_4$.

The following Examples illustrate the effect of carrying out the method of the invention using an acidic aqueous phase.

EXAMPLE 17

A series of iron loaded organic liquids consisting of 1 volume of Versatic 10 dissolved in 2 volumes of Escaid 110 were prepared by method C above and in each case 100 ml of loaded organic liquid were contacted with 100 ml of an aqueous phase containing sulphuric acid at normal pressure at the boiling point of the reaction mixture. The results were as follows:

| Run No. | Initial $Fe^{3+}$ conc. in organic phase | Sulphuric acid conc. in aqueous phase | Effect observed after 5 hours |
|---|---|---|---|
| 1 | 18.7 g/l | 5 g/l | substantially all the iron remained in the organic phase |
| 2 | 25.6 g/l | 10 g/l | amount of iron in organic phase fell to between 1 and 2 g/l |
| 3 | 22.4 g/l | 20 g/l | amount of iron in organic phase fell to less than 0.1 g/l |
| 4 | 23.5 g/l | 40 g/l | amount of iron in organic phase fell to less than 0.1 g/l. |

Under these operating conditions at normal pressure, water would have no effect and no precipitation would be achieved. However in the above cases, when using a sulphuric acid concentration of at least 10 g/l precipitation from the organic phase was observed under comparatively mild reaction conditions.

EXAMPLE 18

Similar experiments to those of Example 17 were carried out using aqueous solutions containing hydrochloric acid. The organic liquid, temperature, pressure and ratio of organic to aqueous phase were as given in Example 17. The results obtained were as follows:

| Run No. | Initial $Fe^{3+}$ conc. in organic phase | Hydrochloric acid conc. in aqueous | Effect observed after 5 hours |
|---|---|---|---|
| 1 | 18.6 g/l | 5.26 g/l | substantially all the iron remained in the organic phase |
| 2 | 18.7 g/l | 7.29 g/l | amount of iron in organic phase fell to between 0.2 and 0.3 g/l |
| 3 | 12.92 g/l | 14.87 g/l | amount of iron in organic phase fell to less than 0.1 g/l |

We claim:

1. A process for stripping metal values from an organic liquid medium, said process comprising:
   providing an organic liquid medium loaded with metal ions, said organic liquid medium being substantially immiscible with water and comprising an organic carboxylic acid cation exchanger; and
   contacting the loaded liquid organic medium with an adqueous phase at a temperature of contact which is sufficiently high so as to cause the metal values to precipitate as metal oxide as herein defined in the presence of the organic liquid medium.

2. The process of claim 1, wherein the organic liquid medium comprises at least one aliphatic carboxylic acid.

3. The process of claim 2, wherein the organic liquid medium comprises at least one highly branched tertiary carboxylic acid.

4. The process of claim 1, wherein the contacting is conducted at a temperature of from 95° C. to 250° C.

5. The process of claim 4, wherein the contacting is conducted at a temperature of from 150° C. to 200° C.

6. The process of claim 1, wherein the organic medium is loaded with ion selected from iron, copper and nickel.

7. The process of claim 6, wherein the organic medium is also loaded with at least one type of metal ion which will co-precipitate with said ions selected from iron, copper and nickel.

8. The process of claim 1, wherein the aqueous phase is water.

9. The process of claim 1, wherein the aqueous phase contains a mineral acid and the contacting is conducted at normal pressure at the boiling point of the reaction mixture.

10. The process of claim 1 further comprising: catalysing the precipitation by addition of previously-isolated metal oxide.

11. A process for extracting metal values from a metal containing process liquor or liquid effluent, said process comprising:
    selectively extracting desired metal ions into an organic liquid medium from a metal-containing process liquor or liquid effluent, said organic liquid medium being substantially immiscible with water and comprising an organic carboxylic acid cation exchanger whereby an organic liquid loaded with metal ions is obtained; and
    contacting said loaded liquid organic medium with an aqueous phase at a temperature of contact which is sufficiently high so as to cause the metal values to precipitate as metal oxide as herein defined in the presence of the organic liquid medium.

12. A process for extracting iron values from a zinc process liquor containing iron values, said process comprising:
    selectively extracting said iron values into an organic liquid medium substantially immiscible in water comprising an aliphatic carboxylic acid; and
    contacting said iron-loaded liquid organic medium with an aqueous phase at a temperature of contact which is sufficiently high so as to cause the iron values to precipitate as iron oxide as herein defined in the presence of the organic liquid medium.

13. A process for stripping metal values from an organic liquid medium substantially in the absence of inorganic anions other than oxide and hydroxide anions, said process comprising:
    providing an organic liquid medium loaded with metal ions, said liquid medium being substantially immiscible with water and comprising an organic carboxylic acid cation exchanger; and
    contacting said loaded liquid organic medium with an aqueous phase at a temperature of contact which is sufficiently high so as to cause said metal values to precipitate as metal oxide in substantially pure form in the presence of said liquid organic medium and in the substantial absence of inorganic anions.

* * * * *